March 20, 1962 E. LEPPER ETAL 3,025,605
ADJUSTABLE MEASURING TABLE
Filed April 26, 1957 4 Sheets-Sheet 1

INVENTORS
ERICH LEPPER
ARTHUR HIRSCHHÄUSER

By *Taulmin & Taulmin*

Attorneys

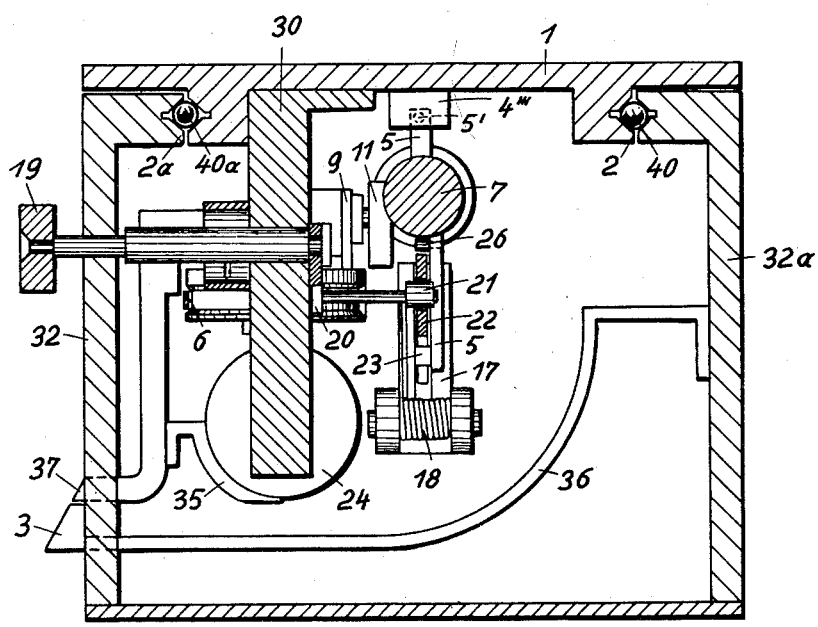
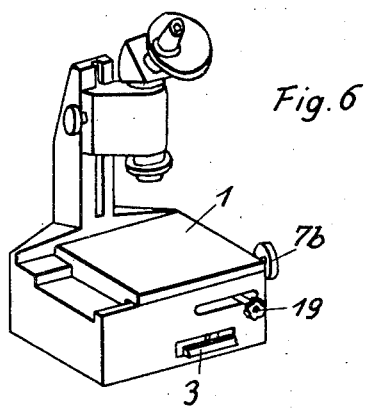

March 20, 1962  E. LEPPER ETAL  3,025,605
ADJUSTABLE MEASURING TABLE
Filed April 26, 1957  4 Sheets-Sheet 3

INVENTORS
ERICH LEPPER
ARTHUR HIRSCHHÄUSER
By Toulmin & Toulmin
Attorneys

March 20, 1962  E. LEPPER ETAL  3,025,605
ADJUSTABLE MEASURING TABLE
Filed April 26, 1957  4 Sheets-Sheet 4
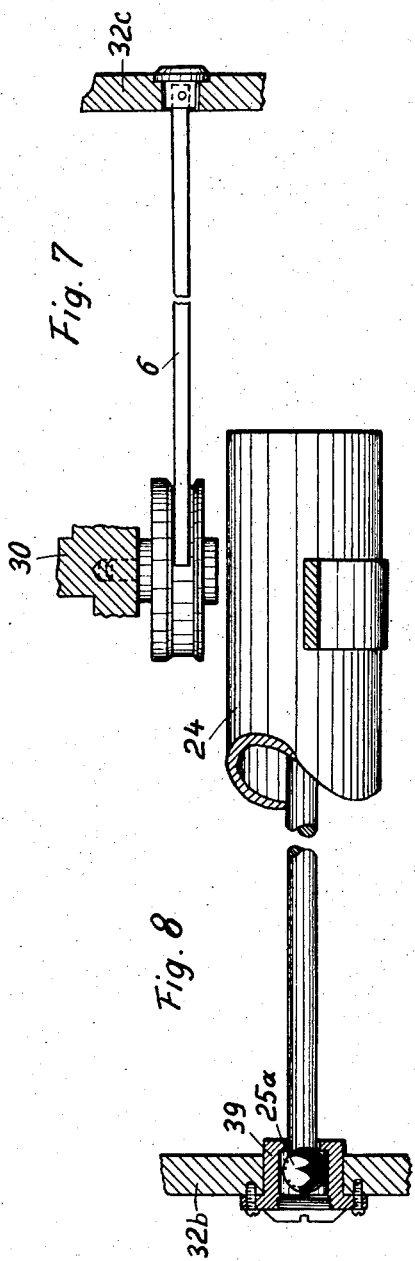
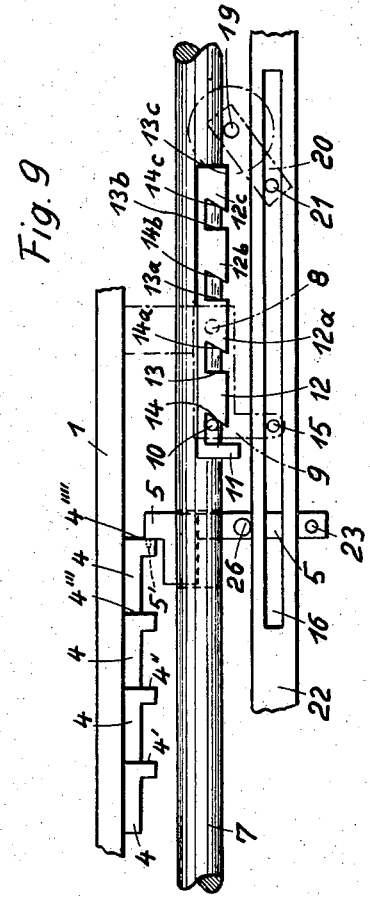
INVENTOR
ERICH LEPPER
ARTHUR HIRSCHHÄUSER
By Taulmin & Taulmin
Attorneys United States Patent Office 3,025,605
Patented Mar. 20, 1962

3,025,605
ADJUSTABLE MEASURING TABLE
Erich Lepper, Waldgirmes, Kreis Wetzlar, and Arthur Hirschhauser, Lohnberg, near Weilburg, Germany, assignors to Carl Zeiss, Heidenheim (Brenz), Wurttemberg, Germany
Filed Apr. 26, 1957, Ser. No. 655,330
Claims priority, application Germany Apr. 27, 1956
11 Claims. (Cl. 33—125)

The present invention relates to adjustable measuring tables for supporting a work piece, specimens and other objects to be processed and/or measured. The invention relates more particularly to adjustable measuring tables for use in fine mechanical machine tools, microscopes and the like mechanical and optical measuring apparatus.

Such apparatus comprises, as a drive arrangement for coarse adjustment of the measuring table, a chain and sprocket or a similar engageable and disengageable drive.

In the apparatus of the above kind, known in the art, which are provided with the aforesaid means for coarse adjustment, the fine adjustment is conventionally achieved by a micrometrical displacement of the drive which engages the measuring table, for instance by a releasable chain and sprocket, or for instance a rack and pawl connection.

It is an advantage of these known devices that the measuring table can be adjusted very exactly, because even the coarse adjustment can be carried out with great exactitude. However, these known devices suffer from the drawback that the engagement of the measuring table is effected by hand and consequently, the engaging elements of the drive means are easily damaged and wear rapidly. As a result, the accuracy of the adjusting operation of the measuring table decreases steadily, so that the measuring table can no longer be used for measurements of the highest accuracy.

It is an object of the present invention to provide for a measuring table, particularly for microscopes, which retains its capacity of permitting accurate measurements even after a prolonged lifetime of the instrument.

It is another object of the present invention to provide for a measuring table, particularly for microscopes, in which the adjustable table drive is subjected to a minimum of wear.

It is still another object of the present invention to provide for a measuring table, particularly for microscopes, which is easier to operate than the known constructions.

These objects are achieved, and the drawbacks of the known devices are avoided in the adjustable measuring table of the invention, which table comprises an arrangement for coarse and fine adjustment of the position of the table for measuring and the like purposes, wherein a device for engagement and disengagement, alternately, of the measuring table with a sequence of engaging elements of a drive member, cooperates with a control device for automatically displacing the measuring table after each disengagement of the aforesaid engaging device from an engaging element by about the distance from one such engaging element to the next adjacent one, or by about a multiple of such distances, whereupon the aforesaid control device automatically re-engages the measuring table in its new position with the corresponding engaging element of the drive member.

According to another feature of the invention, means are provided for imparting to the measuring table a short displacement in a rearward direction, i.e. in a direction opposite to the direction in which the table is to be moved for adjustment to a new position, which rearward displacement is imparted to the measuring table prior to disengaging the same from the aforesaid sequence of engaging elements.

In a preferred embodiment of the invention, the drive member comprising a sequence of engaging elements is mounted in the measuring table and a micrometric drive for fine adjustment is provided with a guide rod for steering the engaging and disengaging device.

The invention will be better understood by the following description of the accompanying drawings, wherein FIGURE 1 is a perspective view of the measuring table of the invention;

FIGURE 2 is a sectional view of the measuring table of the invention taken along the lines II—II of FIGURE 1;

FIGURE 6 is a perspective view of the measuring table of the invention, showing, by way of an example, its use in a microscope;

FIGURE 7 is a front view, partly in section showing the coil spring automatically displacing the measuring table;

FIGURE 8 is a front view, partly in section, of the cylinder-piston arrangement for braking the displacement of the measuring table;

FIGURE 9 is a front view of a part of the measuring table showing the coarse adjustment means for automatically displacing the table.

Figure 4:
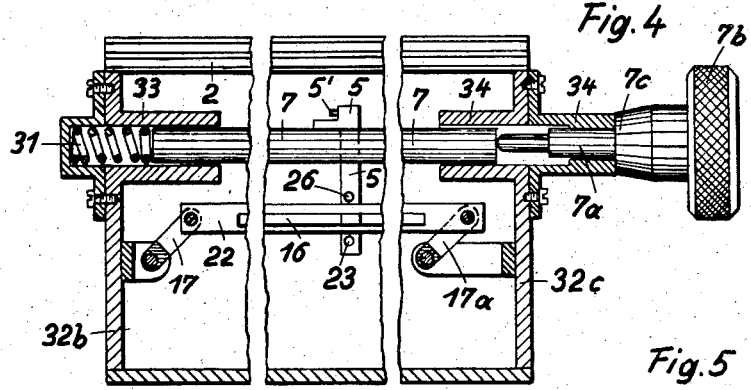
FIGURE 4 is another view, partly in section, of a part of the measuring table of the invention showing the fine adjustment means.

Referring now to the drawings more in detail, the measuring table 1 is movable relative to the housing of the apparatus by being supported on a number of balls 40 housed in a recessed guide rail 2 and another number of balls 40a housed in a recessed guide rail 2a, both of which guide rails 2 and 2a are provided on inwardly flanged portions of the side walls 32 and 32a of the apparatus housing. At the inner surface of table 1 facing a housing interior, there is mounted an adjusting device comprising a sequence engaging elements 4. Each engaging element is provided with a nose having engaging or abutment faces, for instance 4', 4'', 4''', 4'''' all of which are similarly oriented. One of these faces is in contact with a protrusion 5' of a coupling member or abutment element 5 and is pressed there against by a reel-type spiral spring 6 as shall be described further below. In two sleeves 33 and 34 (FIG. 4) mounted respectively on the inside of opposite end walls 32b and 32c of the apparatus housing, there is housed displaceably in the axial direction relative to the sleeves and thereby in the direction of adjusting displacement of table 1, a guide rod 7 which is spring urged by means of a spring 31 housed in sleeve 33, into engagement with a spindle 7a, which is rotatably mounted at the open end of sleeve 34 outside the apparatus housing. Spindle 7a bears at its outward end a micrometric knob 7b and a micrometric scale 7c.

Figure 5:
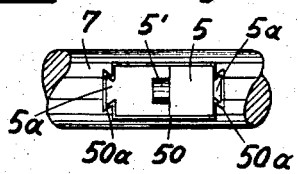
FIGURE 5 is a top view of a part of the measuring table of the invention with the guide rod and the coupling device.

At substantially the central portion of rod 7 there is arranged the aforesaid coupling member 5. This member 5 which has a protrusion 5' formed with an abutment face is mounted in a slot 50 in rod 7 (FIG. 5) and is adapted to be displaced therein in a vertical direction relative to the direction in which the measuring table moves, so as to effect the coupling or uncoupling, respectively, of the measuring table. Coupling member 5 is formed with elongated projections 5a of dovetail cross-section which are slidably arranged in correspondingly shaped recesses 50a of slot 50.

The aforesaid spring 6 is fastened with its outward extending end secured to the apparatus housing, for instance at wall 32c thereof and with its reel mounted on an arm 30 of the measuring table 1, this arm 30 being mounted on the lower side of the measuring table 1 at a right angle thereto. Thereby, coil spring 6 urges the faces 4', 4'', 4''' of the sequence of engaging elements 4 carried by the measuring table against the protrusion 5' of the coupling member 5 carried by the guide rod 7.

The automatic coarse adjustment of the measuring table is effected by the following elements: a lever 9 is fulcrumed at a shaft 8 connected to the measuring table 1. The lever 9 is provided with a roller 10. A bar 11 is mounted upon guide rod 7 and is provided with a plurality of projections 12, 12a, 12b, 12c, which have on one side vertical side surfaces, on their respective other side oblique, sloping camming surfaces 14, 14a, 14b, 14c, and on their bottom side planar, horizontal surfaces. The roller 10 acts as a cam follower and is so positioned relative to the faces 4' to 4''' that when the latter are in contact with the projection 5', the roller is short of engaging surfaces 14, 14a, etc., but is adapted, when swung downwardly about shaft 8, to engage and in a camming manner to roll along the sloped surfaces 14, 14a, 14b, 14c of projections 12, 12a, 12b, 12c, respectively. Furthermore, the lever 9 is provided with a pin 15 fitting into the rectangular, elongated gap 16 of the parallelogram rod 22 which serves as an actuating element for the abutment element 5. The element 22 forms together with the links 17 and 17a and a spring 18 biasing link 17 toward an upright position, a parallelogram linkage arrangement.

The knob 19 is connected to a lever 20 having a pin 21, which latter fits into the gap 16 of rod 22. By turning the knob 19, the rod 22 can be displaced vertically while remaining parallel to the guide rails 2.

The coupling device 5 is provided with a first pin 23 and a second pin 26 (FIG. 9), the first pin 23 being arranged at the lower end of the coupling device 5 underneath rod 22, and the second pin 26 being provided at the upper end, above the rod 22. As the rod 22 is forced downwardly by the pin 21 on lever 20, whenever knob 19 is turned leftwardly, the lower edge of rod 22 comes into contact with the pin 23 and induces the latter to follow in downward direction. Conversely, if the rod 22 moves in upward direction, the upper pin 26 is caused to travel upwardly, too. Thus, the coupling device 5 is pulled out of one of the notches of the sequence of engaging elements whenever the knob 19 is turned leftwardly and the rod 22 and the pin 23 moved downwardly. The coupling device 5 is pushed into one of the notches of the sequence of engaging elements whenever knob 19 is released, and the influence of spring 18 causes rod 22 and pin 26 to move upwardly.

There is a further provided a cylinder 24 mounted against the arm 30. The cylinder is also supported by a support member 35 (FIG. 2), which, in turn, is fastened to the projection 37 of the measuring table. The end of the piston rod 25a is positioned in a sleeve 39 (FIG. 8) which latter is inserted in the wall 32b of the casing. Whenever the measuring table 1 is displaced along guide rails 2, 2a, the cylinder 24, which extends parallel to the longitudinal axis of the measuring table, is dragged along and thus moves relatively to the piston. Consequently, a depression or an excess pressure is produced within the cylinder, and the respective force of reaction created by this depression or excess pressure tends to move the cylinder in the opposite direction. As the cylinder is connected to the measuring table, the cylinder-piston arrangement thus brakes the prevailing movement of the measuring table.

The projection 37 of the measuring table 1 is provided at its lowermost end with a pointer 42. As the measuring table is moved and the projection 37 with it, the pointer 42 glides along the scale 3, which latter is mounted upon the bottom rail 36, and thus indicates the length of coarse displacement of the measuring table. For the length of fine displacement there is provided the micrometric scale 7c on the knob 7b.

Operation

The coarse adjustment of the measuring table comprises, for example, intervals in the order of 25 mm. In order to effect this coarse adjustment of the measuring table, the knob 19 must be turned counterclockwise, as indicated by the arrow in FIGURE 1 of the drawings. By this movement, pin 21 on lever 20 is induced to push rod 22 downwardly. The pin 15 resting within gap 16 of the rod 22 moves downwardly, too, and the roller 10 engages and travels down the sloped cam surface 14 (or 14a, 14b, 14c, as the case may be). Because of the oblique configuration of these surfaces 14, 14a, 14b, 14c, the measuring table is moved to the left relative to bar 11, guide rod 7, and coupling device 5 and the surface 4' (or 4'', 4''', as the case may be) of the sequence of engaging elements 4 is moved out of contact with protrusion 5' of the coupling device 5. After contact between one of the surfaces 4, 4' etc. and the protrusion 5' has ceased, which will have occurred by the time the roller 10 rolls off the end of surface 14 (or 14a, etc.), the rod 22 engages and pushes down pin 23 of the device 5. Thereby, the coupling device 5 is pulled from its operative position downwardly into a retracted position out of the range of the plane defined by the lowermost extension of the surfaces 4', 4'', 4''' of the sequence of engaging elements 4. As soon as roller 10 rolls off the end of the surface 14 (or 14a, etc.), spring 6 pulls the measuring table 1 to the right, with roller 10 travelling on the lower, horizontally extending surface of the projections 12, (or 12a, 12b, 12c, as the case may be). If knot 19 is released, then as soon as the roller 10 reaches the next encountered rectangular surface 13 (or 13a, 13b, 13c) the roller is pushed into the adjoining groove in the bar 11, due to the influence of spring 18 of the parallelogram linkage arrangement. The ascending rod 22 finally hits against pin 26. The measuring table 1 continues to be moved to the right by the spring 6 until the surface 4' (or 4'', 4''', as the case may be) of the sequence of engaging elements 4 comes into contact with the protrusion 5' of the coupling device 5.

Thus, the automatic displacement of the measuring table 1 from one engaging element to the next following element to the right is initiated and automatically executed simply by turning knob 19 to the left.

Figure 1:
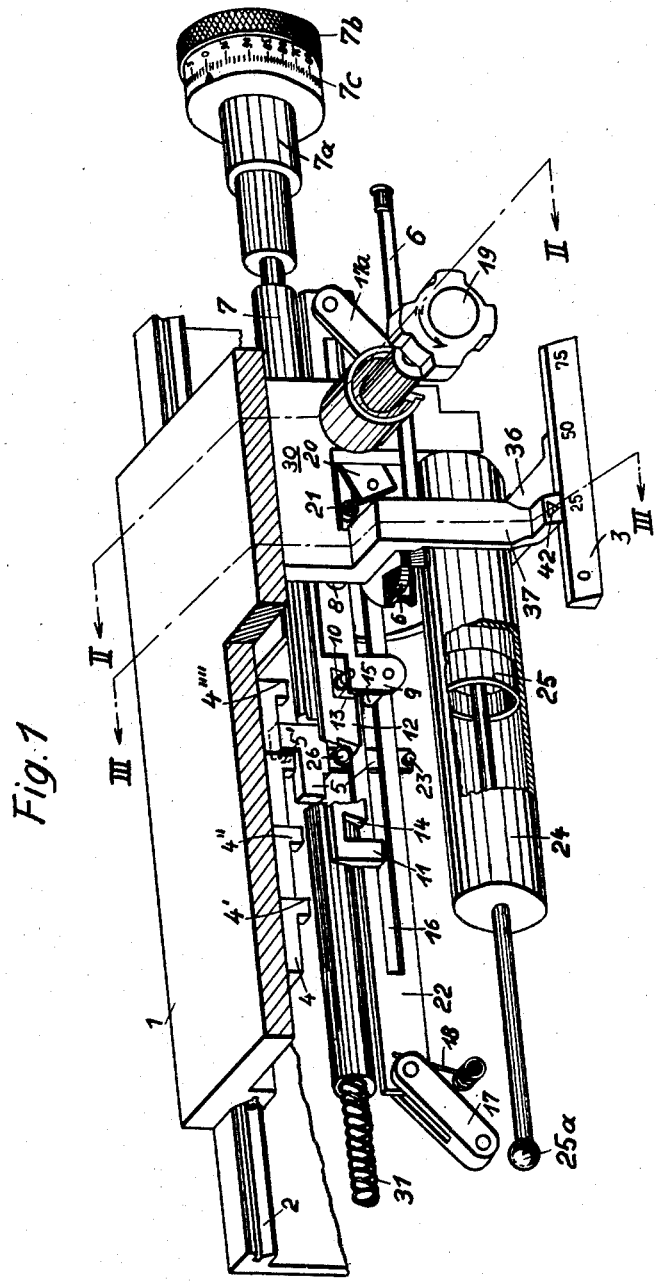
Figure 3:
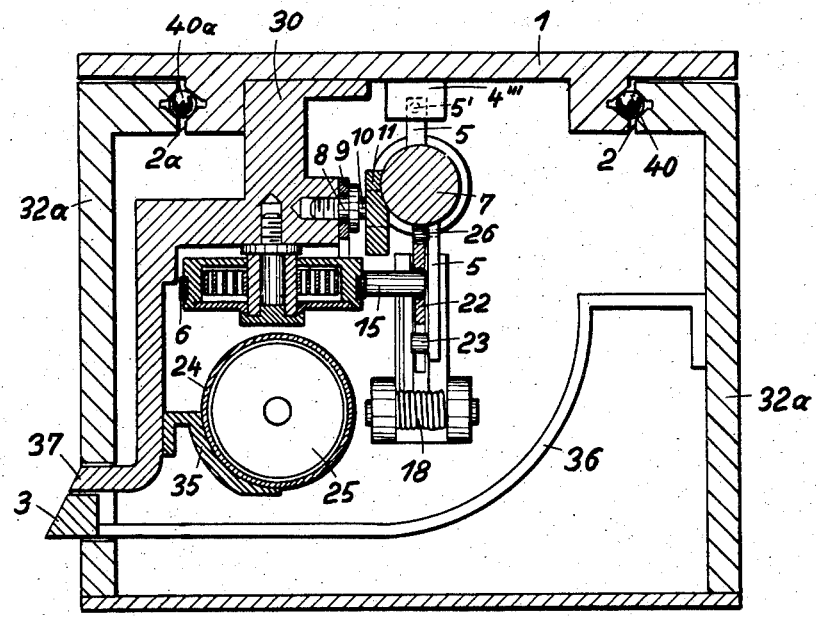
FIGURE 3 is another sectional view of the measuring table of the invention taken along the lines III—III of FIGURE 1.

If the measuring table is to be moved to the left, the knob 19 must again be turned leftwardly as indicated by the arrow in FIGURE 1 of the drawings. After coupling device 5 and protrusion 5' have been disengaged the measuring table is then manually moved to the left. After the knob 19 has been released, the measuring table is automatically pulled to the right due to the influence of spring 6, until the coupling device 5 has been engaged with the next following notch of the sequence engaging elements in the manner described in greater detail further above.

The fine adjustment of the measuring table comprises the range between one engaging element and the next following engaging element. It is effected by turning the knob 7b and then thereby moving the coupling device 5 and, hence, the measuring table which is in contact with the protrusion 5' and which is either forced to the left by protrusion 5' if the knob 7b is turned in clockwise direction, or which follows the receding protrusion 5' to the right due to the influence of spring 6, if the knob 7b is turned in counter clockwise direction.

It will be understood that this invention is susceptible to modification in order to adapt it to different usages and conditions, and, accordingly, it is desired to comprehend such modifications within this invention as may fall within the scope of the appended claims.

What we claim is:

1. A coarse adjustment mechanism for a table member which is mounted upon a base member for movement relative thereto in a predetermined direction, said mechanism comprising: cooperating first and second abutment means carried on said members, respectively, said first abutment means having a plurality of similarly oriented abutment faces which are spaced from each other in said direction and correspond to different positions of coarse adjustment, and said second abutment means comprising an abutment element having an abutment face, said abutment element being movable relative to the member on which it is carried between an operative position wherein said abutment face of said element may engage any one of said abutment faces of said first abutment means so as to prevent movement of said members relative to each other and a retracted position wherein said abutment face of said element can not engage any one of said abutment faces of said first abutment means; means constraining the second abutment means from sliding movement over any abutment face of the first abutment means; biasing means continuously urging said abutment element to its operative position; and operating means for displacing said members relative to each other in said direction in a sense in which said abutment face of said element and one of said abutment faces of said first adjusting means are moved out of contact with each other, for thereafter moving said element to its retracted position so as to allow free movement of said members relative to each other, and for thereafter allowing said element to be moved back to its operative position under the influence of said biasing means at an instant before a subsequent abutment face of said first abutment means would engage said abutment face of said element, whereby during coarse adjustment, sliding movement of said abutment face of said element relative to any one of the abutment faces of said first abutment means is prevented.

2. A coarse adjustment mechanism for a table member which is mounted upon a base member for movement relative thereto in a predetermined direction, said mechanism comprising: cooperating first and second abutment means carried on said members, respectively, said first abutment means having a plurality of similarly oriented abutment faces which are spaced from each other in said direction and correspond to different positions of coarse adjustment, and said second abutment means comprising an abutment element having an abutment face, said abutment element being movable relative to the member on which it is carried between an operative position wherein said abutment face of said element may engage any one of said abutment faces of said first abutment means so as to prevent movement of said members relative to each other and a retracted position wherein said abutment face of said element can not engage any one of said abutment faces of said first abutment means; means constraining the second abutment means from sliding movement over any abutment face of the first abutment means; moving means acting on said table member for continuously exerting thereon a force tending to move said table member along said direction in that sense in which one of said abutment faces of said first abutment means and said abutment face of said element, when the latter is in its operative position, are urged into engagement with each other; and operating means for first moving said table member along said direction but in the opposite sense, for thereafter retracting said abutment element, for thereafter freeing said table member so as to allow the same to be moved in said one sense by said moving means, and for thereafter moving said abutment back to its operative position at an instant before a subsequent abutment face of said first abutment means would engage said abutment face of said element, whereby during coarse adjustment, sliding movement of said abutment face of said element relative to any one of the abutment faces of said first abutment means is prevented, said operating means comprising: an actuating element for moving said abutment element between its positions, and cooperating cam and cam follower means carried by said members, respectively, said cam follower means being connected to said actuating element for moving the same in a manner coordinated with the relative movement of said members.

3. A mechanism as defined in claim 2 wherein said cam is formed with a plurality of sections corresponding to the plurality of abutment faces of said first abutment means, each section having a camming surface which causes said table member, through the intermediary of said cam follower means, to move in said opposite sense.

4. A mechanism as defined in claim 3 wherein said constraining means is arranged to delay movement of said abutment element from its operative to its retracted position until after said table member has been moved in said opposite sense.

5. A mechanism as defined in claim 4 further comprising manually operable means for activating said operating means.

6. A mechanism as defined in claim 2 wherein said first abutment means is carried on said table member and wherein said abutment element of said second abutment means is carried on said base member.

7. A mechanism as defined in claim 6 wherein said abutment element is carried on said base member through the intermediary of a micrometric fine adjustment means.

8. A mechanism as defined in claim 2 further comprising a braking device for retarding movement of said table member under the influence of said moving means.

9. A mechanism as defined in claim 2 wherein said actuating element is continuously biased to a position wherein said abutment element is held in its operative position.

10. A mechanism as defined in claim 2 wherein said actuating element is mounted as part of a parallelogram linkage.

11. A coarse adjustment mechanism for a table member which is mounted upon a base member for movement relative thereto in a predetermined direction, said mechanism comprising: cooperating first and second abutment means carried on said members, respectively, said first abutment means having a plurality of similarly oriented abutment faces which are spaced from each other in said direction and correspond to different positions of coarse adjustment, and said second abutment means comprising an abutment element having an abutment face, said abutment element being movable relative to the member on which it is carried between an operative position wherein said abutment face of said element may engage any one of said abutment faces of said first abutment means so as to prevent movement of said members relative to each other and a retracted position wherein said abutment face of said element can not engage any one of said abutment faces of said first abutment means; means constraining the second abutment means from sliding movement over any abutment face of the first abutment means; biasing means continuously urging said abutment element to its operative position; moving means acting on said table member for continuously exerting thereon a force tending to move said table member along said direction in that sense in which one of said abutment faces of said first abutment means and said abutment face of said element, when the latter is in its operative position, are urged into engagement with each other; and operating means for displacing said members relative to each other in the opposite sense against the action of said moving means, for thereafter moving said element to its retracted position so as to allow said moving means to move said table member in said one sense, and for thereafter allowing said element to be moved back into its operative position under the influence of said biasing means at an instant before a subsequent abutment face of said first abutment means would engage said abutment face of said element, whereby during coarse adjustment, sliding movement of said abutment face of said element relative to any one of the abutment faces of said first abutment means is prevented.

References Cited in the file of this patent

UNITED STATES PATENTS

| | | |
|---|---|---|
| 1,528,314 | Wickman | Mar. 3, 1925 |
| 1,649,695 | Higgins | Nov. 15, 1927 |
| 2,200,884 | Hoagland | May 14, 1940 |
| 2,236,881 | Rusnak | Apr. 1, 1941 |
| 2,421,440 | Thorpe | June 3, 1947 |

FOREIGN PATENTS

| | | |
|---|---|---|
| 147,002 | Austria | June 7, 1951 |
| 557,069 | Great Britain | Nov. 3, 1943 |